Figure 4:
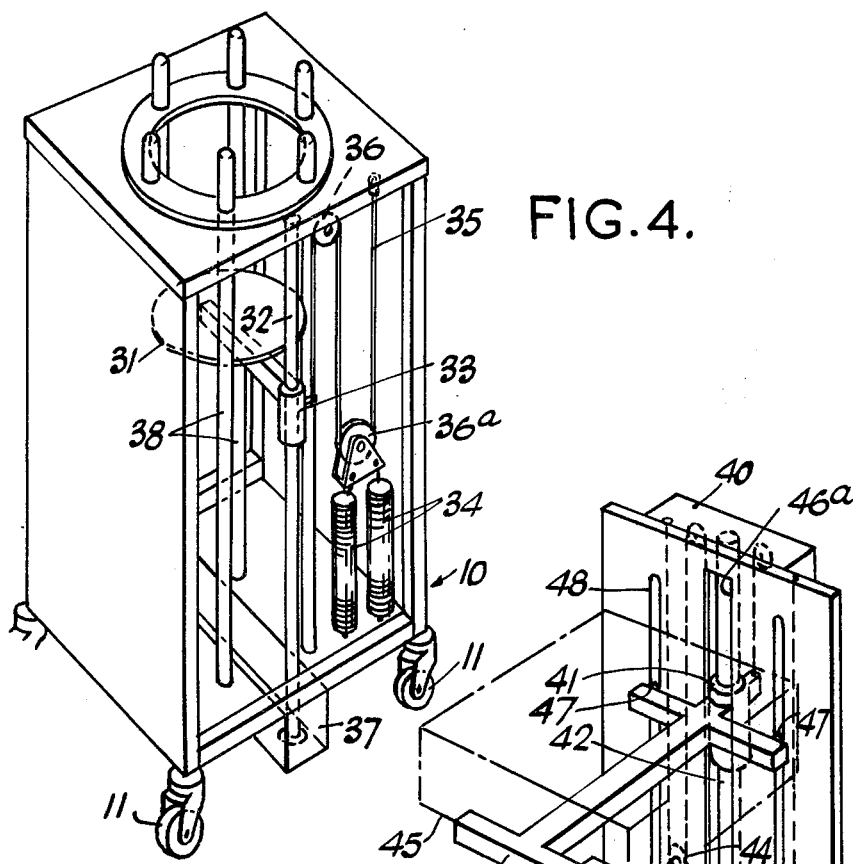

United States Patent [19]

Whitelaw et al.

[11] 4,009,915
[45] Mar. 1, 1977

[54] SELF-LEVELING KITCHEN AND FOOD SERVICE EQUIPMENT

[76] Inventors: Alan Roy Whitelaw, 4A Warriston St., Brighton, Victoria; Henry Alfred Jennings, 4 Scammell Close, Mount Waverley, Victoria, both of Australia

[22] Filed: Oct. 15, 1974

[21] Appl. No.: 515,054

[30] Foreign Application Priority Data

Oct. 16, 1973 Australia .......................... 5257/73

[52] U.S. Cl. ................................................ 312/71
[51] Int. Cl.² ........................................... A47F 1/06
[58] Field of Search ............. 221/279, 280; 312/71; 211/49 D

[56] References Cited

UNITED STATES PATENTS

| | | | |
|---|---|---|---|
| 2,251,874 | 8/1941 | Gibbs | 312/71 |
| 2,692,177 | 10/1954 | Larsen | 312/71 |
| 3,436,136 | 4/1969 | McKechnie | 312/71 |
| 3,635,173 | 1/1972 | Ruben | 312/71 X |

Primary Examiner—Robert B. Reeves
Assistant Examiner—Francis J. Bartuska
Attorney, Agent, or Firm—Bucknam and Archer

[57] ABSTRACT

Dispensing and storage equipment which may be mobile for crockery, trays and glassware including a compact cabinet or supporting frame housing or supporting a support platform and a counterbalancing spring or springs, the support platform being mounted for movement between a fully loaded position at the base of the cabinet or frame and an unloaded position at the top of the cabinet or frame, stored articles being removeable from the stack at a convenient height. The counterbalancing spring or springs work in tension and have a deflection of no more than half the amplitude of movement of the support plate, the plate being guided on a guide shaft and bearing support. A well is provided in the floor of the cabinet or frame to accommodate supporting members of the plate and the bearing support when in the fully loaded position to allow maximum utilization of the available space in the equipment. The support plate may be supported as a cantilever as well as simply supported. A heated enclosed cabinet is optionally provided.

3 Claims, 6 Drawing Figures

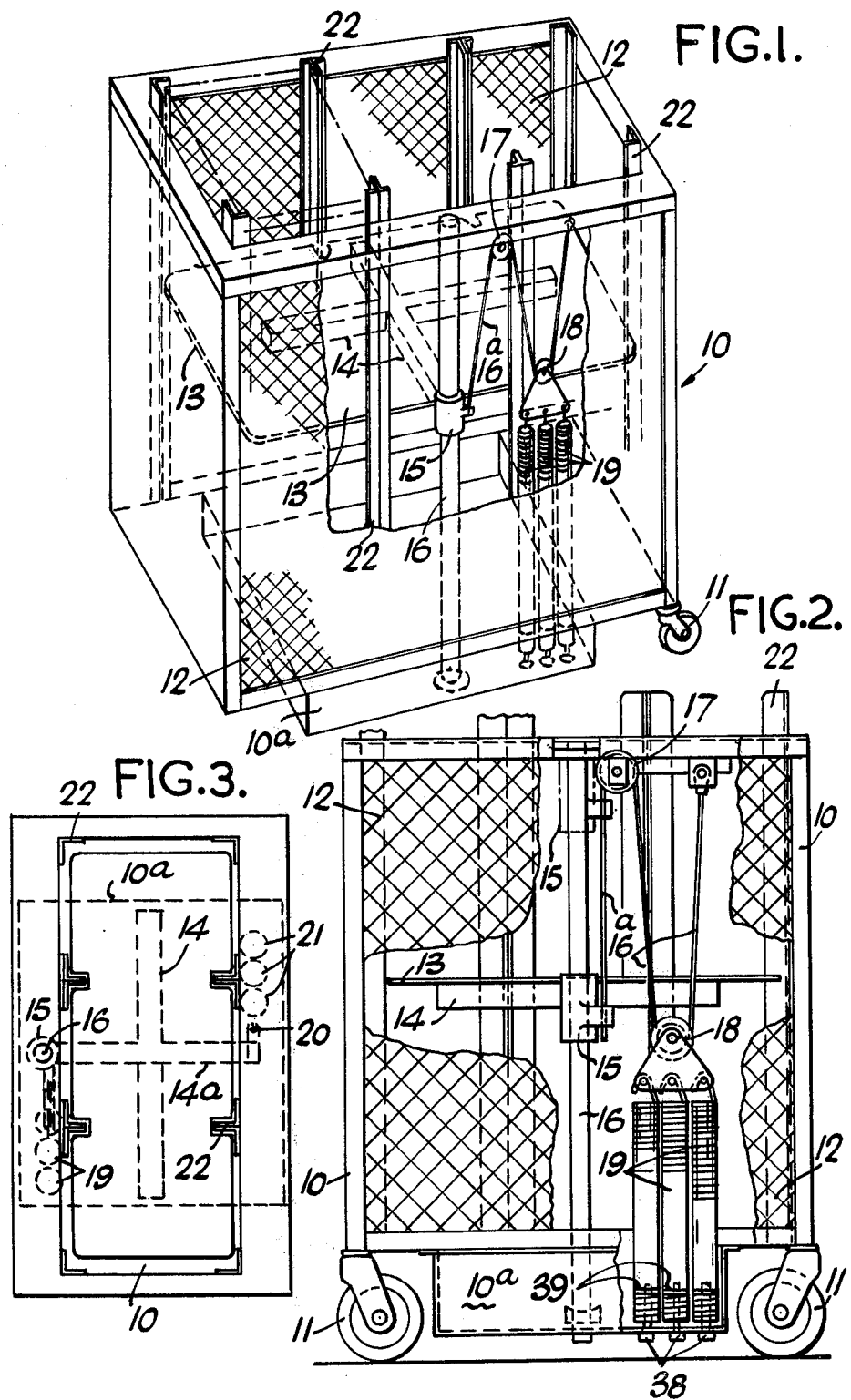

SELF-LEVELING KITCHEN AND FOOD SERVICE EQUIPMENT

This invention relates to kitchen and food service equipment and particularly to crockery dispersers.

Most known units utilise simple coiled helical compression spring(s) mounted on a fixed or mobile frame, the spring including guides and a support for food plates, saucers, cups, dishes, trays, or the like. The units are at convenient bench height to facilitate convenient and efficient assembly of tray sets or meals to avoid stooping.

Any spring column is dimensioned to suit only one particular component and vertical feeding of the stack of components stored is effected by a spring(s) so proportioned as to lift the stack the width or pitch of a single component as one is removed so keeping the top of the stack substantially at the predetermined level and/or bench height. Each column of components is carried by a platform which may correspond in shape to the particular component or may support several wire baskets each containing a quantity of components. In some cases the platforms are supported by a helical compression spring placed underneath and working vertically with the platform and stored components in a tube or cage for guidance and alignment. In some cases the moving platform is attached in a cantilevered manner to a moving carriage travelling on vertical rails. Spring counter balancing of the carriage, platform and its load is provided in the area adjacent to the rails. The platform is mounted for movement in a tube or cage.

The major disadvantage with such devices is that the fully compressed spring and the guide segments, sleeves or bushes necessary for control thereof and to prevent buckling of the spring, take up a significant amount of vertical space which could otherwise be used for supporting extra utensils.

In addition, the cost of manufacture of springs in known devices is relatively high and furthermore, their operation when used in dispensers equipped with heating facilities is erratic because of variation in spring rate and tension with temperature. Jamming of a partially or fully loaded platform is prevalent in normal use. Also, compression spring rate adjustment of the unit to accommodate utensils of differing weight is virtually impossible, with existing equipment.

Floor space in large kitchens such as in hospitals, hotels, institutions or the like, is at a premium because of the large amounts of crockery, cooking equipment and staff involved. It is normal with dispensing equipment handling crockery that some form of heating is used so that whilst the crockery is stored in the unit it may also be heated by providing thermostatically controlled heating elements. Thus, before the meal is served onto a plate the plate has been warmed in storage. Of course, unheated equipment is also used for serving of cold meals or preprepared meals to be heated at some later time. In this regard the entire loaded unit may be kept refrigerated and of course, the unit must make efficient use of the space available.

Efficient use of limited kitchen floor space is an important factor in the design of equipment such as dispensers known under the Trade Mark LOWERATOR.

The present invention intends to utilise commonly used and commercially available tension springs which are more easily manufactured from high grade steels comparatively unaffected by high or low temperatures when in use. Alternatively commercial grade materials in ambient temperature conditions may be used. Furthermore, the invention seeks to provide simple yet effective and reliable guiding means for the movable support member to prevent jamming under load.

Particularly with mobile dispensers the amount of vertical space available in a given dispenser is defined between clearly defined limits. The height of the dispenser may be no higher (or lower) than that which provides a comfortable workiing height for an operative working with the dispenser. The lower height limit is above the wheels which are preferably below the base plate within the confines of the dispenser perimeter to avoid any permanent projection beyond the sides of the dispenser. Existing equipment known to Applicants does not fully utilise the available space between the above-mentioned lower and upper limits for items being dispensed. A proportion of the space is given over to accommodating guiding equipment springs and/or cable pulleys. Many have attempted to reduce the space wasted by the operating mechanisms, however, in the main this has led to inefficient operation or undue expense in manufacture. The present invention seeks to overcome the problem in a very simple and effective manner.

It is an object of the present invention to provide an improved crockery dispenser in which the top item to be drawn off is at a constant height, the entire useful height of the dispenser is substantially fully utilised and the abovementioned drawbacks are substantially or completely eliminated.

There is provided by the present invention a dispenser of the type in which a stack of crockery, trays or the like are stored with the top item to be dispensed at a substantially constant height relative to floor level comprising a frame or body, a support plate mounted relative to the frame or body, tension spring means mounted on the frame or body, said support plate means guided by guide means for vertical slidable movement relative to the frame or body between a bottom and top position under the influence of said spring means.

In one aspect there is provided a dispenser of the type in which a stack of crockery, trays or the like are stored with the top item to be dispensed at a substantially constant height relative to floor level comprising a frame or body, a support plate mounted relative to the frame or body, tension spring means mounted on the frame or body, said support plate means guided by guide means for vertical slidable movement relative to the frame or body between a bottom and top position under the influence of said spring means, the total deflection of said spring means is less than the total movement of said support plate between said positions. The support plate is preferably horizontal.

In a further aspect of the invention there is provided a mobile dispenser of the type in which a stack of crockery, trays or the like are stored with the top item to be dispensed at a substantially constant height relative to floor level comprising a frame or body, a support plate mounted relative to the frame or body, tension spring means mounted on the frame or body, said support plate means guided by guide means for vertical slidable movement relative to the frame or body between a bottom and top position under the influence of said spring means, the total deflection of said spring means is less than the total movement of said support plate between said positions, said spring means being mounted beside the path of movement of the support plate means, the guide means including at least one vertical guideway mounted relative to the frame or body and including one or more linear motion ball bearing devices or similar roller assembly equivalent connected to the support plate means for maintaining the support plate means substantially in a horizontal plane irrespective of the loading on the plate means, a base in the dispenser supported on wheels, a well in the base extending between the wheels, the well acting to accommodate said ball bearing or similar device and at least part of the support plate means when in its bottom or lowermost position whereby the space between the bottom and upper position of the support plate means is usable for goods to be handled by the dispenser.

The frame or body of the dispenser may consist of an enclosed housing which may be heated or an open mesh type housing for cool storage. Alternatively, the frame may comprise a base and one side pillar housing the tension spring means and guide means for the support plate means.

In yet another form the frame may comprise a base and twin pillars on opposite sides of the base, each pillar housing a tension spring and cable assembly and at least one pillar housing housing the guide and bearing assembly. In each instance a well is provided in the base of the structure to receive the guide bearing and at least part or all of the support plate structure and/or support plate and/or components being dispensed to achieve full amplitude of usable movement of the support plate and/or components being dispensed.

The spring means is mounted in the frame or body beside the path of movement of the support plate means and is connected to the support plate means by a cable or the like through a simple pulley system, the spring means being connected to the cable through a pulley acting to at least halve the spring deflection required. The tension springs are mounted in banks of 1 or more to reduce their size and therefor reduce the bulkiness of the housing. A considerable reduction in the dimensions of the housing for the guide means and springs is achieved by the invention.

The guide means includes one or more vertical guideways mounted on the frame or body carrying a linear motion ball bearing or equivalent as before connected to the support plate so that the plate and guide may form a cantilever structure. Alternatively, a guideway and support bearing may be on each end of a support plate structure. A well is formed in the floor of the frame of the unit to accommodate the ball bearings or equivalent and fittings to the plate support when the support plate is at the bottom position i.e. when fully loaded with crockery or the like. In the case of a mobile unit the well will be located between the wheels.

To offset the possibility of overloading of the cantilever structure a further spring and cable assembly may be attached to the opposite side of the support plate means. Alternatively, where this is not possible for example, in open structure dispensers for trays of cups and the like, a pair of guide spindles may be positioned side by side each carrying a linear bearing structure and supporting a load tray is provided. The same spring and pulley arrangement is provided as before. With suitable designs a cantilever construction using only one guide spindle and bearing is required.

Figure 5:
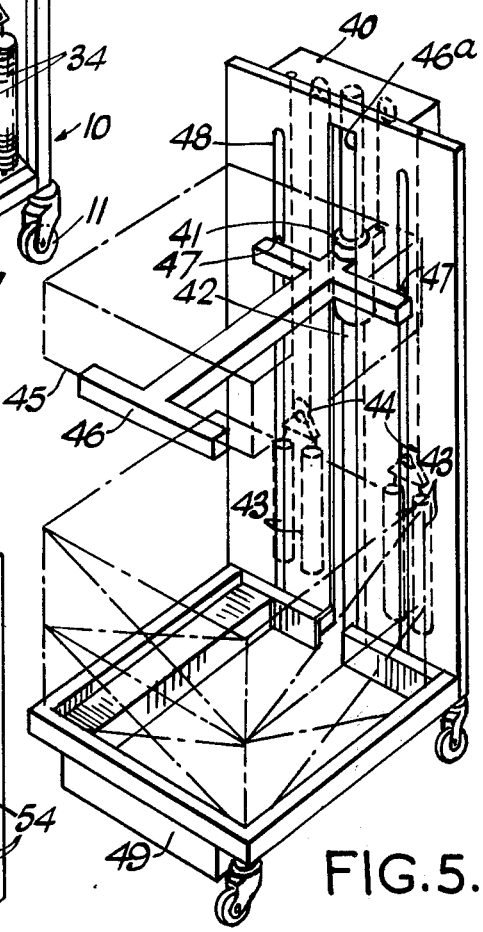
Figure 6:
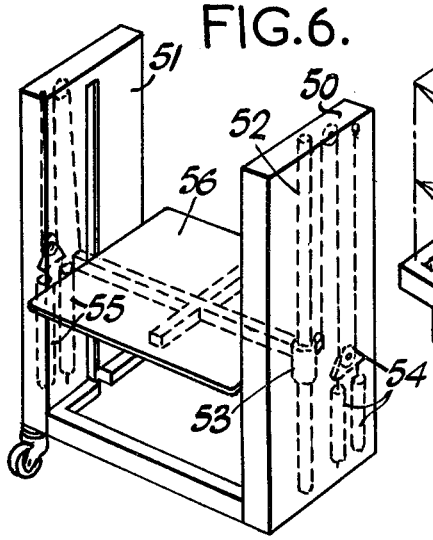

The invention will be described in greater detail when having reference to the accompanying drawings in which:

FIG. 1 is a partial perspective view of one form of dispenser made by the invention, FIGS. 2 and 3 are side and plan views respectively of the dispenser. FIG. 2 is a view from side A of FIG. 3, FIG. 4 shows a totally enclosed unit for plate dispensing, FIG. 5 shows a cantilever unit, and FIG. 6 shows a twin pillar open frame construction.

In one practical arrangement illustrated in FIGS. 1 to 3 a dispenser unit comprises a rectangular frame or body 10 mounted on castors 11 of suitable size. The unit shown comprises an open frame enclosed with mesh walls 12. The mesh provides a partial enclosure but allows circulation of air within and/or through the body. The dispenser is provided with a support platform 13 mounted on a strong under frame 14 preferably made from square section steel which is light but strong. The frame 14 is directly connected to a linear bearing collar 15 on one side of the platform 13, the collar being mounted for slidable movement on vertical shaft or column 16 mounted in the frame 10.

The collar 15 is connected to a cable 16a running over pulleys 17 and 18 and attached to preferably adjustable tension springs 19. Preferably a group of three springs are provided to maintain their diameter at a minimum in relation to the available space at the side of the platform. However, of course, a single spring or more springs may be provided depending on the need for adjustment and space. Of course, adjustment need not be provided for but coarse adjustment may be arranged simply by removing or adding to the number of springs provided. The platform may be supported simply as a cantilever in the manner of the structure depicted in FIG. 5; however, as illustrated in FIG. 3, a cable 20 is preferably connected to cross member 14a connected to tension springs 21 to counterbalance the weight of the platform and lighten lateral loading on the guide shaft. With suitably designed bearing and shaft sizes the platform can be supported in cantilever fashion.

According to the invention a well is provided in the floor between the wheels to accommodate the guide saddle and bearing 15 and platform support frame 14. Thus the dimension of the space between the top of the wheels and the top of the dispenser, which is a substantially fixed dimension, is fully utilised in storing articles to be dispensed. None of the utilisable space is wasted.

The amplitude of movement of the springs 19 may be one half the amplitude of movement of the platform as a result of the travelling pulley 18. Vertical guide bars 22 are provided which have a two fold purpose:— To prevent or restrict sway of the platform during use and to provide limit stops with multiple stacks of articles on the platform. Alternatively, a perforated sheet or flexible wire mesh is arranged to surround the platform thereby doing away with the need for wire baskets normally used for small articles such as cups and saucers.

In the embodiment shown "T" section guide bars 22 are provided along the sides of the opening such that the platform can conveniently support three stacks of similarly sized and shaped articles. Alternatively the "T" section bars are easily removeable and flat strip like members may be substituted to perform its normal guiding function and yet allow the placement of a large article, having similar dimension to the platform, in the dispenser. Thus the dispenser shown is readily adaptable to differing sizes or shapes of articles.

The enclosed unit shown in FIG. 4 includes at least one centrally mounted plate support 31 mounted on a vertical spindle 32 by at least one linear journal 33 or equivalent for vertical guiding of the plate support 31. The plate 31 is movable between the floor and the top of the unit under the influence of tension spring 34 mounted in the corners of the dispenser and connected to the plate by a cable 35 and pulley 36 system. The cable connecting the springs is via a pulley 36a to achieve a reduction is deflection of the springs to preferably at least half that of the plate support. Accordingly, the springs can be easily accommodated in the corners or elsewhere of the unit as shown without absorbing usable stacking space. Where double or treble or more in line units are the guide rods and pulley/spring units would require other locations, such as at the corners of an inline unit. Construction of the guides and spring counterbalancing mechanisms according to the invention allows simple locating of these components in such multiple units. Guide rods 60 are provided spaced about the support plate to restrict swaying movement of the plate during movement of the dispenser and during use.

The linear journal 33 is a ball race commercially available in various sizes suitable for the cantilever loads encountered by units of the invention, e.g. as shown in FIG. 5. Alternatively, the support plate may be supported on standard rollers mounted on each side of the shaft to accept the lateral loading. The floor of the unit is provided with a well 37 to accommodate the ball race or rollers and connections to the plate support. With known mobile units the well in between the wheels is space not normally utilised. Accordingly, all usable vertical space between the base and top of the unit at least is available for the storage of crockery items and the like.

The tension springs 34 are of convenient size readily and economically available and may be of stainless steel or other heat resisting materials to resist the adverse effects of heat in a heated unit. Having reference to FIG. 2, the height of the top item of the stack in the unit is simply and finely adjustable by bolt 38 adjustment on the spring mounting. The nut may be of plate construction 39 for the insertion between the coils of the spring as shown in FIG. 2. Spring rate adjustment is provided by selecting a predetermined number of coils of each or the spring to be subject to deflection thus the coils below the plate will be rendered ineffective. The number of coils may be changed to change the spring assembly deflection/load characteristics to that required for more exact counter-balancing of the pitch/weight factor of the plate or other components of that particular unit.

The cabinet of the unit may be heated by a suitable electric element which is thermostatically or otherwise controlled to warm the crockery as desired. The cabinet is totally enclosed excepting for the top aperture through which the uppermost articles of crockery protrude. Therefore, there is very little heat lost by convection. This may be substantially blocked by providing a hood over the plate stack. Some air ingress may be desirable to reduce stale odours. Drainage holes may be provided.

FIGS. 5 and 6 show different embodiments of the present invention. FIG. 5 shows a cantilever structure with a single pillar housing 40 for housing the linear bearing 41 and vertical guide 42 and counter-balancing tension springs 43 connected via cables and pulleys 44.

The platform 45 is supported on a "H" section frame 46 connected through a slot 46a to the linear race mounted centrally of the unit. The springs are provided on each side of the guide to fully support the loaded platform. The platform may be provided with runners 47 or slides engaging the face 48 of the pillar housing 40. A well 49 is provided between the wheels to accommodate the frame and linear race for reasons previously described.

FIG. 6 shows an alternative construction wherein twin pillars 50, 51 are provided one housing a vertical guide 52 and linear race 53 and associated springs and pulleys 54 and the other pillar housing simply springs and pulleys 55. The pillars are of small dimension relative to the size of the platform 56 and provides a heavy duty structure yet having easy access to above and below the platform.

In both arrangements shown in FIGS. 5 and 6 the space below the platform may be utilised for accommodating empty trays and the like after being unloaded when empty from the support platform thus a problem of disposal of empty cup trays and the like during a meal preparation period is overcome.

Alternative counter-balancing spring arrangements are envisaged by the present invention such as providing a pivotable lever arm controlled by a tension spring. The lever is freely pivoted at one end and attached to a travelling pulley at the other carrying a cable. The lever is connected at a point along its length which may be adjustable to control positioning of the platform as it is loaded or unloaded. The spring tension may be adjustable and its travel is no greater than half the amplitude of movement of the platform.

Accordingly, the unit of the present invention provides for full utilization of vertical space for accommodation of crockery to the extent that there is up to 20% or more usable space for a given size cabinet thus saving valuable floor space. Furthermore, operation of the unit is more sensitive or responsive to the weight of applied or removed components having low friction and low hysterisis values. Tilting of the platform away from the horizontal in any direction is virtually prevented and jaming from this cause eliminated. Spring counter-balancing pressure and load/deflection rate characteristics are easily adjustable between very wide limits. The unit can be adapted for use as a dispenser of various items of china, metal plastic or glass or other materials.

We claim:

1. A mobile dispenser of the type in which a stack of crockery, trays, glass ware, food serving equipment are stored with the top item to be dispensed at a substantially constant height relative to floor level comprising a frame or body, support plate means mounted relative to the frame or body, tension spring means having coils mounted on the frame or body, said support plate means guided by guide means for vertical slidable movement relative ive to the frame or body between a bottom and top position under the influence of said spring means, the total deflection of said spring means being less than the total movement of said support plate means between said positions, said spring means being mounted beside the path of movement of the support plate means, means including an adjusting plate disposed to engage each spring between a predetermined pair of said coils to adjust the spring deflection rate and a bolt extending longitudinally of the spring and being threaded in an opening in said adjusting plate to apply preload forces to said spring means to selectively adjust the position of the support plate means, the guide means including at least one vertical guideway mounted relative to the frame or body and including a linear motion ball bearing connected to the support plate means for maintaining the support plate means substantially in a horizontal plane irrespective of the loading on the plate means, a base in the dispenser supported on wheels, a well in the base extending between the wheels, the well adapted to accommodate said ball bearing and at least part of the support plate means when in its lowermost position whereby the space between the bottom and upper position of the support plate means is usable for goods to be handled by the dispenser, said wheels supporting the dispenser being mounted on the base plate to be within the confines of the dispenser perimeter whereby permanent projection beyond said perimeter is avoided.

2. A dispenser as claimed in claim 1 wherein the frame comprises a base and a single pillar structure at one side housing said spring means and guide means counterbalancing and supporting the support plate means in cantilever manner.

3. A dispenser as claimed in claim 1 comprising a base and twin pillars on opposite sides of the base, each pillar housing a tension spring and cable assembly and one pillar housing the guide and bearing assembly, two sides of the dispenser being open to allow access to beneath the support plate means when above its lowermost position.

* * * * *